United States Patent [19]
Nakagawa et al.

[11] Patent Number: 5,120,140
[45] Date of Patent: Jun. 9, 1992

[54] SINTERED OIL-IMPREGNATED BEARING

[75] Inventors: Hisaya Nakagawa; Toru Nakanishi, both of Komagane, Japan

[73] Assignee: Sankyo Seiki Mfg. Co., Ltd., Nagano, Japan

[21] Appl. No.: 601,868

[22] Filed: Oct. 23, 1990

[30] Foreign Application Priority Data

Oct. 24, 1989 [JP] Japan ................................ 1-274917

[51] Int. Cl.$^5$ ........................ F16C 33/02; B21D 53/10
[52] U.S. Cl. .................................... 384/279; 384/902; 29/898.054
[58] Field of Search ............................... 384/279, 902; 29/898.054, 898.057

[56] References Cited

U.S. PATENT DOCUMENTS

| | | | |
|---|---|---|---|
| 2,855,249 | 10/1958 | Gerard | 384/279 |
| 2,894,792 | 7/1959 | Brilli | 384/279 |
| 3,046,068 | 7/1962 | Sternlicht | 384/279 |
| 3,140,131 | 7/1964 | Tann | 384/279 |
| 3,445,148 | 5/1969 | Harris et al. | 384/279 |
| 4,290,655 | 9/1981 | Apuzzo et al. | 384/902 X |

Primary Examiner—Thomas R. Hannon
Attorney, Agent, or Firm—McAulay Fisher Nissen Goldberg & Kiel

[57] ABSTRACT

A sintered oil-impregnated bearing is disclosed having a plurality of evenly extending smoothed areas on the inner periphery surface for receiving a rotary shaft, the smoothed areas having a constant angular width of 10° to 90°, the remaining surface areas between any adjoining two of said smoothed areas being kept porous. Such a sintered oil-impregnated bearing can be realized without the process of aging and ensures a good oil circulation on the smoothed surface areas, a high precision assembling operation because of the exactly circular and concentric configuration of the inner and outer peripheries and an easy and accurate alignment of the smoothed surface areas and the corresponding contact areas of the rotary shaft. Therefore, a sintered oil-impregnated bearing according to the invention is free from any metallurgical damage and can be manufactured in an existing manufacturing facility without significantly modifying the manufacturing equipment.

18 Claims, 4 Drawing Sheets

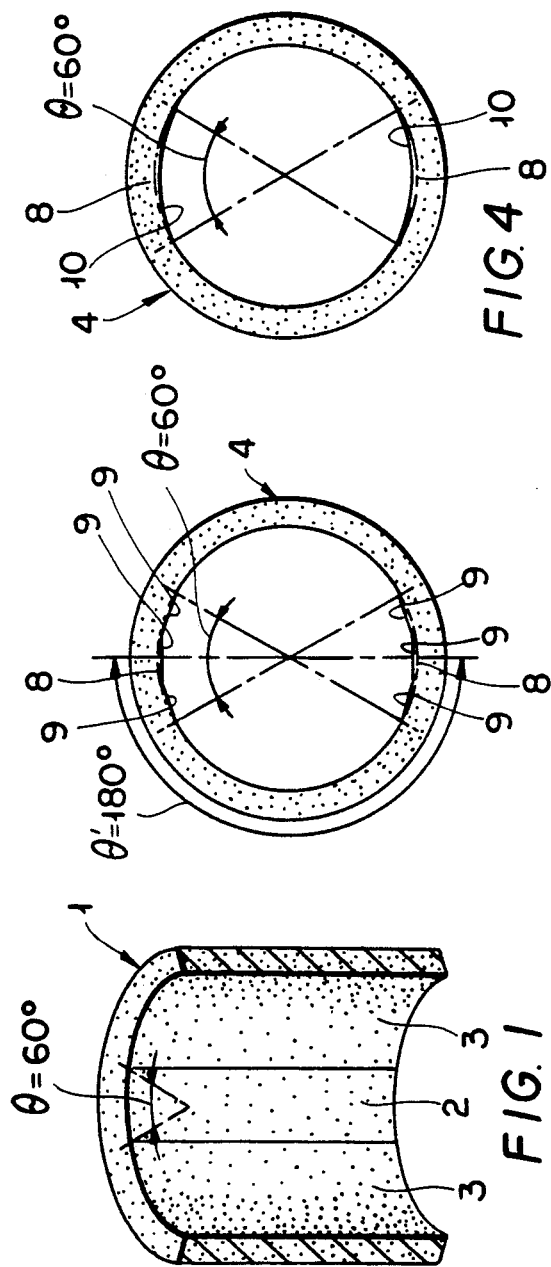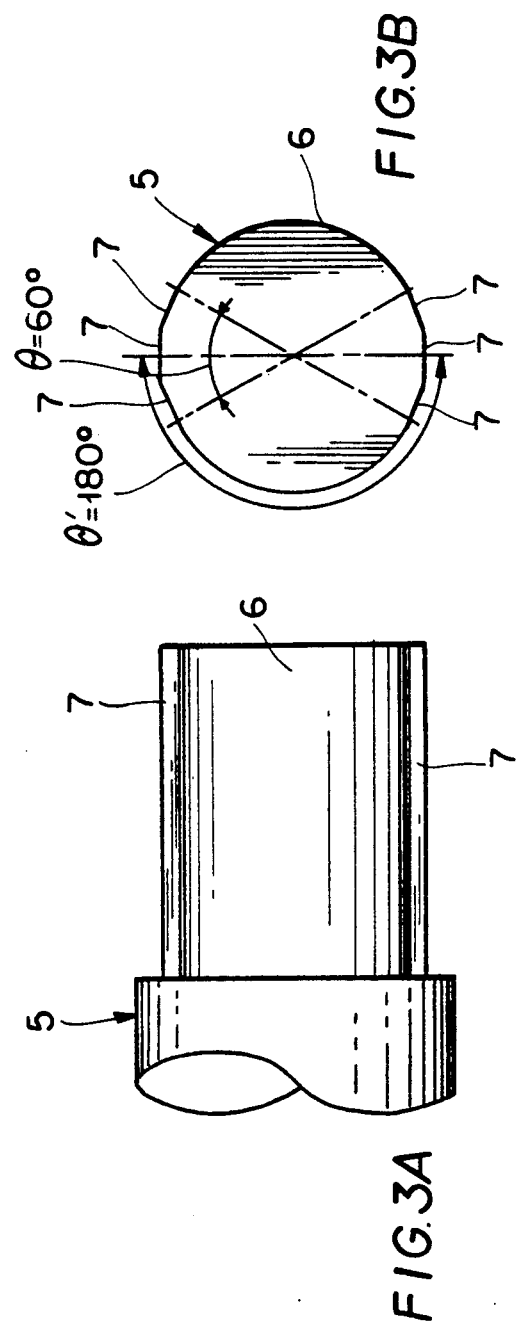

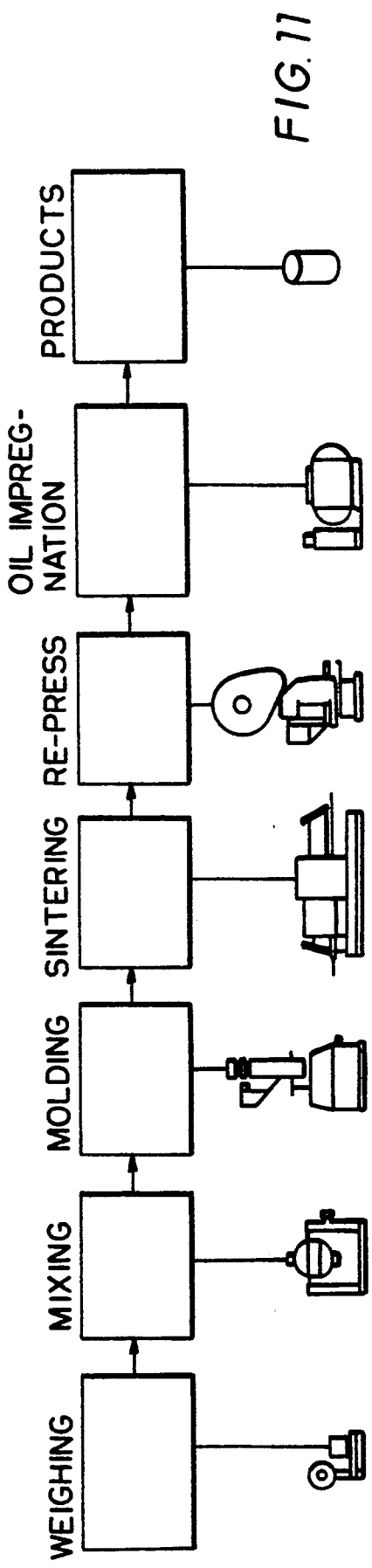
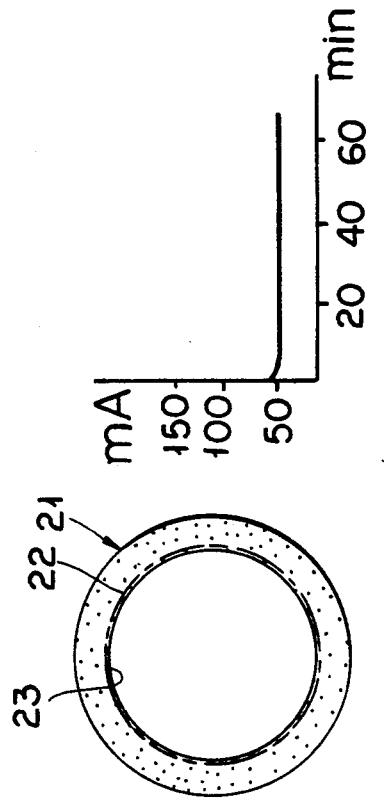
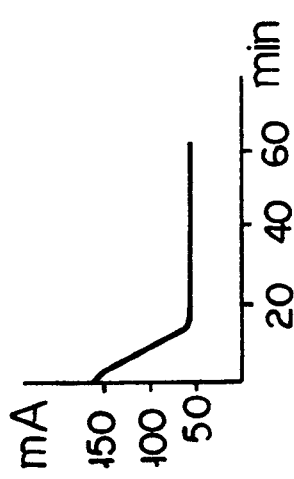
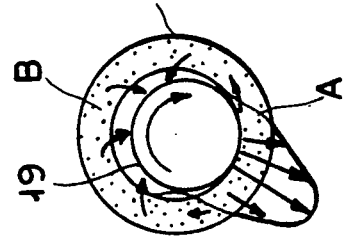

SINTERED OIL-IMPREGNATED BEARING

BACKGROUND OF THE INVENTION

1. Field of the Invention

This invention relates to a sintered oil-impregnated bearing having a smoothed surface and a porous surface formed on the inner peripheral surface of the bearing.

This application has subject matter which is related to application Ser. No. 584,158, filed Sep. 18, 1990, entitled Oil Impregnated Sintered Bearing, assigned to the same assignee.

2. Background Prior Art

A conventional sintered oil-impregnated bearing is prepared typically by following the process schematically illustrated in FIG. 11 of the accompanying drawings and including the steps of weighing the ingredients of the compound, mixing, molding and sintering the compound. Such a bearing has one, or more than one, porous surface formed by oil-filled pores on the inner peripheral surface of the bearing. When a bearing of this type is used with a rotary shaft 19 of a capstan motor 18 of an audio- or video recording apparatus as illustrated in FIG. 12 and the rotary shaft 19 is subjected to lateral pressure as shown in FIG. 13, a large portion of the oil contained within the bearing can flow out, based on the principle schematically illustrated in FIG. 14, so that adjoining metal components can cause friction that can result in abnormal abrasion (scar a) and seizure of the metal components as the oil film protecting the bearing is moved away. In order to avoid this problem, conventional sintered oil-impregnated bearings are subjected to an aging operation or a cutting operation using a sizing margin as described in Japanese Patent (Jikkai) No. 50-101735.

With the lubricating system of a conventional sintered oil-impregnated bearing as schematically illustrated in FIG. 14, oil can escape, to a large extent, from the pores of the porous surface A of the bearing 20 when the motor is started. As a result, a phenomenon of boundary lubrication takes place, causing a large shaft loss current value to occur. Thereafter, the frictional surface of the motor is plastically deformed by the friction with the rotary shaft 19 so that the porous surface is smoothed away and a high oil pressure is generated to bring forth a phenomenon of fluid lubrication as indicated by a curved arrow B. This, in turn, causes a phenomenon of aging where the porous surface is smoothed out to reduce the shaft loss current value until a stable level is reached. The aging operation is conducted to attain the stable level without problem.

FIG. 15 shows a plan view of a conventional molded and sintered oil-impregnated bearing 21, where the broken line indicates the inner peripheral surface 22 after sizing and the solid line indicates the inner peripheral surface 23 with a sizing margin of 50 $\mu$m. FIG. 16 shows the change with time of the shaft loss current value.

Both the aging operation as described above and the use of a sizing margin as disclosed in the above cited Japanese Patent document are accompanied by the following drawbacks.

1) Where the aging operation is involved:

a) Since the motor has to be driven for 0.5 to 4 hours in a variable speed mode with a constant side pressure for the aging operation in an aging apparatus, the cost for the required man-hours, equipment and space can be enormous.

b) While every aging apparatus is specifically designed for a particular purpose (in view of the variety of customers' requirements in terms of side pressure) and can accommodate only a specific direction of side pressure (unable to cover a certain angular width), it cannot necessarily meet the requirements of a specific customer and troubles can result.

Further, the accuracy with which a particular machine installed by the supplier operates does not necessarily match the accuracy with which the aging apparatus operates and, therefore, there can be a discrepancy in the level of accuracy, causing operational difficulties.

2) With the technique disclosed in the above cited Japanese Patent Document, an axial half of the inner peripheral surface of the bearing of the rotary shaft that actually bears the load is smoothed out to prevent any run-off of oil film as indicated by a dotted semicircular line in the drawing, while the other half that does not bear any load remains porous to allow the oil to flow out.

However, the bore of the molded bearing does not present an exactly circular cross section but has a semicircular sizing margin and the outer periphery shows a circular cross section which is not necessarily concentric with that of the inner periphery. These facts can constitute drawbacks for this technique. Besides, since the sizing margin for smoothing has large dimensions, the metal metallurgic structure of the bearing can be damaged or become brittle to degrade its surface precision.

Moreover, since the smoothed area of the bearing shows an angular width of more than 90° and constitutes nearly half of the inner periphery to reduce the remaining porous area from which oil can emerge, it presents poor oil circulation and consequently a high or fluctuated friction torque, particularly, when the motor rotates at a high speed at low temperature.

In view of the above mentioned problems of the prior art, it is therefore an object of the present invention to provide a sintered oil-impregnated bearing having an exactly circular bore cross section that does not require any aging operation and can be manufactured without significantly altering the existing manufacturing facilities by forming a plurality of evenly extending smoothed areas on the inner peripheral surface of the bearing, the smoothed surfaces having a constant angular width of 10° to 90°, the remaining surface areas between any adjoining two of said smoothed areas being kept porous.

SUMMARY OF THE INVENTION

According to the invention, the above object of the invention is achieved by providing a sintered oil-impregnated bearing having a plurality of evenly extending smoothed areas on the inner peripheral surface for receiving a rotary shaft, the smoothed surfaces having a constant angular width of 10° to 90°, the remaining surface areas between any adjoining to two of said smoothed areas being kept porous.

For a better understanding of the present invention, reference is made to the following description and accompanying drawings while the scope of the invention will be pointed out in the appended claims.

BRIEF DESCRIPTION OF THE DRAWINGS

In the drawings,

FIG. 1 is a perspective view of a first embodiment of the sintered and molded oil-impregnated bearing of the invention showing part of the inner peripheral surface having a smoothed area and surrounding porous areas.

FIG. 2 is a plan view of the embodiment of FIG. 1.

FIG. 3(a) is a side view of a molded core rod to be used for molding the embodiment.

FIG. 3(b) is a plan view of the core rod of FIG. 3(a).

FIG. 4 is a plan view of a second embodiment which is a modification of the embodiment of FIG. 1.

FIG. 10 is a graph illustrating the change with time of the shaft loss current value of an agingless sintered oil-impregnated bearing according to the invention.

FIG. 11 is a flow chart of the process of manufacturing oil-impregnated bearings.

FIG. 14 is a diagram illustrating how oil circulates within an oil-impregnated bearing.

FIG. 15 is a plan view of a conventional sintered oil-impregnated bearing prior to the sizing operation.

FIG. 16 is a graph showing the change with time of the shaft loss current value of a conventional sintered oil-impregnated bearing.

DETAILED DESCRIPTION OF THE INVENTION (PREFERRED EMBODIMENTS)

Figure 5:
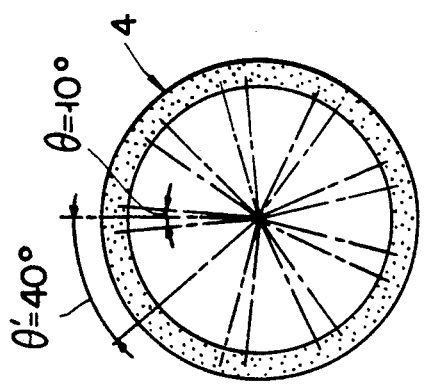
FIG. 5 is a plan view of a third embodiment having nine smoothed areas, each with an angular width of $\theta = 10°$, the axial center lines of any two adjoining ones being equally separated by $\theta' = 40°$.

Referring to FIG. a sintered oil-impregnated bearing 1 is manufactured by following the process of FIG. 11. FIG. 4 shows an intermediary body 4 molded by using a core rod 5 as illustrated in FIGS. 3(a) and (b). Then, at the re-press step as shown in FIG. 11, a sizing bar having a circular cross section with a diameter substantially equal to the diameter of intermediary body 4 is pushed into the bore of the body 4 to form a sintered oil-impregnated bearing 1 having smoothed surface areas 2 and porous surface areas 3.

As seen from FIG. 3, the plan view of the molding core rod 5 shows two identical curved surface areas 6 each having an arc-shaped cross section with a central angle of 120° and two identical polygonal surface areas 7 each having a polygonal cross section with three straight segments formed within an angular width of $\theta = 60°$, the center lines of the broken lines 7 being separated by $\theta = '180°$.

When an intermediary body 4 is formed by means of a molding core rod 5 as shown in FIG. 2, the body 4 has a pair of oppositely located polygonal surface areas 9 inwardly rising from the broken line in FIG. 2 showing the inner periphery. These polygonal surface areas 9 respectively correspond to the polygonal surface areas 7 of the outer periphery of the molding core rod 5.

Then, at the re-press step, the intermediary body 4 is subjected to a sizing process to produce a sintered oil-impregnated bearing 1.

During the sizing process, the polygonal surface areas 9, each having three segments of the intermediary body 4, are smoothed out by the outer peripheral surface of the cylindrical sizing bar to produce smoothed surface areas 2 within the inner periphery 8 having a cross section whose diameter is substantially equal to the outer diameter of the circular cross section of the sizing bar, while the remaining areas of the inner periphery 8 are kept porous. Consequently, the inner periphery 8 of the sintered oil-impregnated bearing 1 comprises a pair of smoothed surface areas, each having an angular width of $\theta = 60°$ in cross section and a center line separated by $\theta = 180°$ from the other, and a pair of porous surface areas, each having an angular width of 120° in cross section.

After the re-press step of using a sizing bar as described above, the sintered oil-impregnated bearing 1 proceeds to the step of oil-impregnation to complete the entire process of manufacturing.

The finished sintered oil-impregnated bearing 1 does not require any aging process and hence it is an agingless sintered oil-impregnated bearing.

FIG. 10 shows the change with time of the shaft loss current value of an aging-less sintered oil-impregnated bearing 1 according to the present invention showing substantially no initial high stages as compared with the graph of a conventional sintered oil-impregnated bearing as illustrated in FIG. 16.

An embodiment having smoothed surface areas 2 with an angular width of $\theta = 60°$ and relatively large porous areas 3 ensures smooth rotation of the rotation shaft it will carry.

The inner periphery of a sintered oil-impregnated bearing 1 according to the invention shows an exact circular cross section because a plurality of identical sizing margins having an identical angular width remain intact after insertion of a cylindrical sizing bar into its precursor or intermediary body 4. Therefore, the outer and inner peripheries of the hollow cylindrical bearing are concentric and ensure an enhanced precision of the subsequent assembling operation to protect the metallurgical structure of the product.

Moreover, according to the present invention, sintered oil-impregnated bearings with different smoothed area profiles can be prepared by simply changing the molding core rod 5 in a common manufacturing facility to significantly reduce the manufacturing cost of the bearings.

FIG. 4 illustrates a second embodiment of the invention having curved surface areas 10 with an angular width of $\theta = 60°$. Such surface areas 10 are slightly raised from the inner peripheral surface 8 of the intermediary body 4 indicated by a broken line.

For smoothing the surface of the intermediary body 4, a molding core rod having a pair of corresponding surface areas with an angular width of 60° is used in place of the molding core rod 5 having polygonal surface area 7 with an angular width of $\theta = 60°$, each comprising as illustrated in FIG. 3(a).

When the intermediary body 4 of the second embodiment is subjected to a sizing process to form a sintered oil-impregnated bearing 1, the curved surface areas 10 is smoothed to become smoothed surface areas 2, while the remaining inner peripheral areas 8 of the intermediary body 4 become porous surface areas 3.

Figure 18:
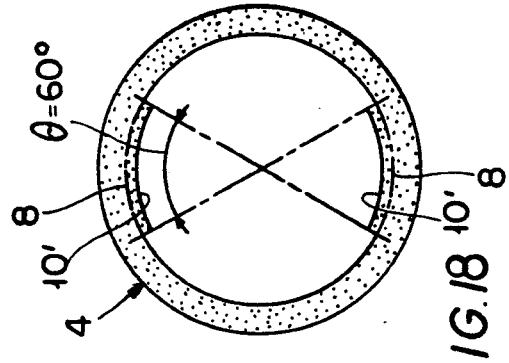
FIG. 18 is a plan view of another embodiment of the sintered and molded oil-impregnated bearing of the invention.

In FIG. 18, showing still another embodiment of the invention, an intermediary body 4 comprises curved surface areas 10' to be smoothed to become smoothed surface areas with an angular width of $\theta = 60°$. The cross section of each of the areas 10' has a radius of curvature smaller than that of the inner periphery 8 of the hollow cylindrical intermediary body 4 but the areas 10' are concentric with the intermediary body 4.

Figure 6:
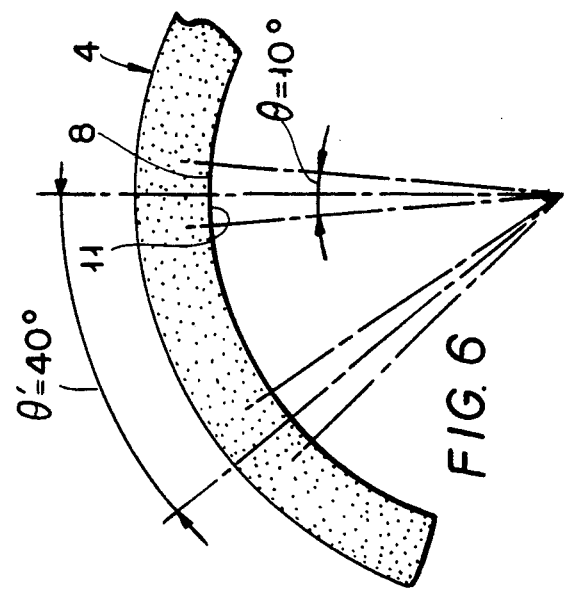
FIG. 6 is an enlarged partial plan view of the embodiment of FIG. 5.

FIGS. 5 and 6 illustrate an embodiment having up to 9 prism-like surface areas, any adjoining ones of which are separated by an identical angle $\theta = 40°$ as viewed from the center line of the areas. Each of the prisms has a central angle of $\theta = 10°$ and a flat surface 11 slightly raised from the inner peripheral surface of the intermediary body as indicated by a broken line. The surfaces 11 are smoothed at a later stage.

Figure 7:
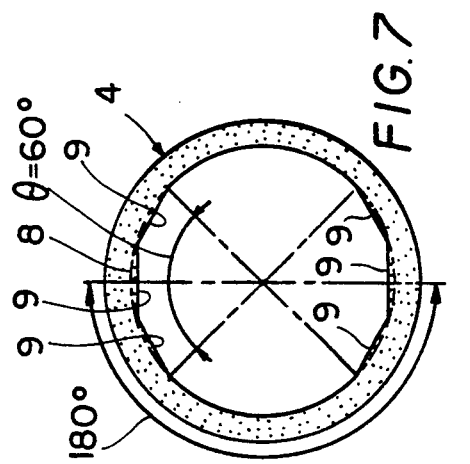
FIG. 7 is a plan view of a fourth embodiment having two smoothed areas with an angular width of $\theta = 90°$ whose axial center lines are separated by $\theta' = 180°$.

FIG. 7 shows still another embodiment of the invention having oppositely arranged two prism-like surface areas to be smoothed having an angular width of $\theta = 90°$, the center lines of said areas being separated by $\theta' = 180°$. Each of the prism-like surface areas has three segments 9 which are slightly raised from the inner periphery of the intermediary body 4 indicated by a broken line. These segments 9 constitute the surface areas to be smoothed at a later stage.

Figure 8:
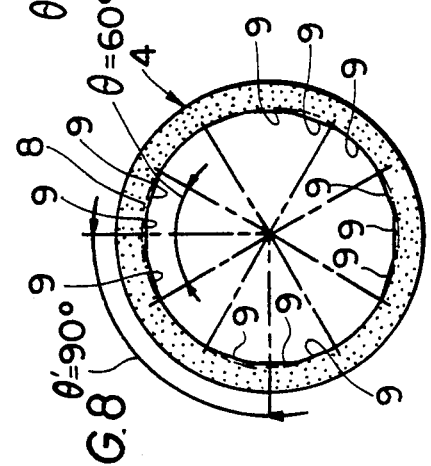
FIG. 8 is a plan view of a fifth embodiment having four smoothed areas with an angular width of $\theta = 60°$, the axial center lines of any two adjoining ones being equally separated by $\theta' = 90°$.

FIG. 8 shows still another embodiment of the invention having up to four prism-like surface areas to be smoothed having an angular width of $\theta = 60°$, the center lines of any adjoining ones being separated by $\theta' = 90°$. Each of the prism-like surface areas has three segments 9 which are slightly raised from the inner periphery of the intermediary body 4 indicated by a broken line. These segments 9 constitute the surface areas to be smoothed at a later stage.

Figure 9:
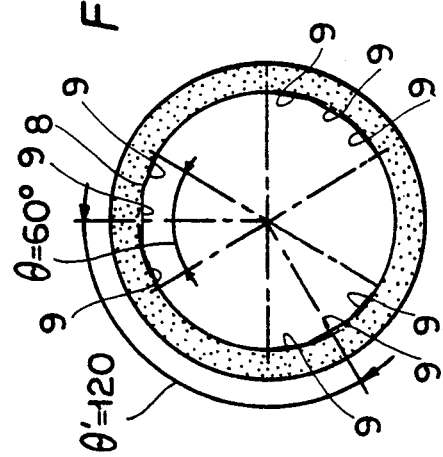
FIG. 9 is a plan view of a sixth embodiment having three smoothed areas with an angular width of $\theta = 60°$, the axial center lines of any two adjoining ones being equally separated by $\theta' = 120°$.
Figure 12:
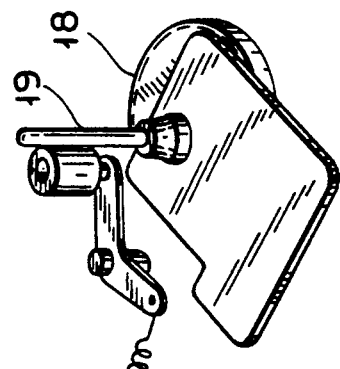
FIG. 12 is a perspective view of a rotary motor shaft which is subjected to high side pressure at the output end.
Figure 13:
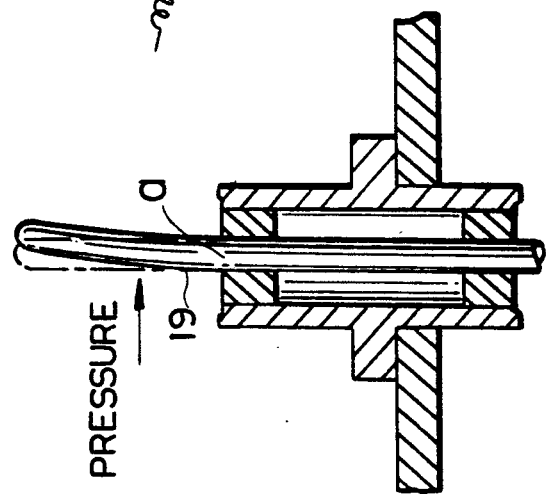
FIG. 13 is an axial sectional view of the rotary motor shaft of FIG. 12 illustrating how it is subjected to side pressure.

FIG. 9 shows still another embodiment of the invention having up to three prism-like surface areas to be smoothed having an angular width of $\theta = 60°$, the center lines of adjoining ones being separated by $\theta' = 120°$. Each of the prism-like surface areas has three segments 9 which are slightly raised from the inner periphery of the intermediary body 4 indicated by a broken line. These segments 9 constitute the surface areas to be smoothed at a later stage.

With a sintered oil-impregnated bearing according to the invention, the circulation of oil on the smoothed surface areas 2 can be significantly deterred when the angular width of each of the smoothed surface areas 2 exceeds 90°, whereas alignment of the smooth surface areas 2 and the corresponding areas of the rotary shaft becomes very difficult and mutual displacement can take place to bring the rotary shaft into contact with the porous surface areas when the angular width is smaller than 10°. Under such conditions, the agingless feature of the invention becomes meaningless. In other words, the angular width of each of the smoothed surface areas 2 should be kept within 10° and 90° in order to maintain the agingless feature and the operability of a sintered oil-impregnated bearing according to the invention.

When a sizing bar is introduced into an intermediary body 4 of the invention, care should be taken so that the smoothed surface areas 2 are subjected to the side pressure applied by the rotary shaft. A re-press step as shown in FIG. 16 using a sizing bar after the intermediary body is housed in a housing 12 is recommended.

Figure 17:
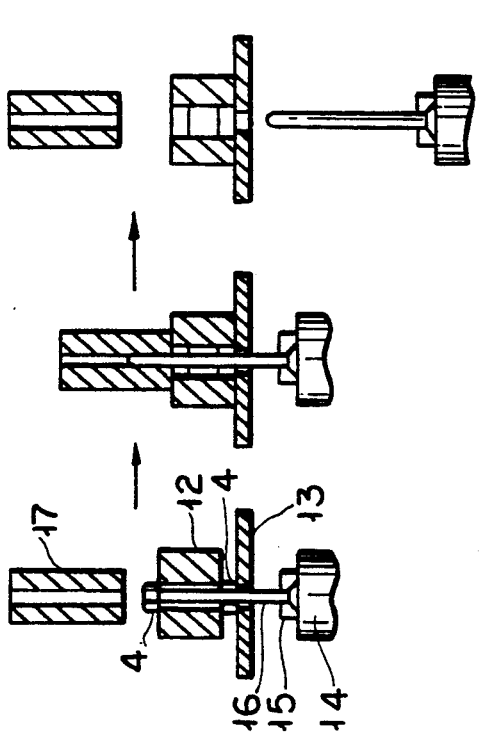
FIG. 17 is a schematic illustration showing how a molded bearing is housed in a bearing holder.

In FIG. 17, the intermediary body 4 and the housing (bearing holder) 12 are placed on a table 13 and a mandrel 16 anchored to a lower ram 14 by means of a holder 15 is introduced into the intermediary body 4. Thereafter, the intermediary body 4 is forcibly introduced into the housing 12 by means of an upper punch 17.

As is apparent from the above description, a sintered oil-impregnated bearing according to the invention can be realized without the process of aging and ensures a good oil circulation on the smoothed surface areas, a high precision assembling operation because of the exactly circular and concentric configuration of the inner and outer peripheries and an easy and accurate alignment of the smoothed surface areas and the corresponding contact areas of the rotary shaft. Therefore, a sintered oil-impregnated bearing according to the invention is free from any metallurgical damage and can be manufactured in an existing manufacturing facility without significantly modifying the manufacturing equipment.

While the foregoing description and drawings represent the preferred embodiments of the present invention, it will be obvious to those skilled in the art that various changes and modifications may be made therein without departing from the true spirit and scope of the present invention.

What is claimed is:

1. A sintered oil-impregnated bearing comprising a bearing element having exactly two evenly extending substantially non-porous, smoothed areas on an inner peripheral surface for receiving a rotary shaft, said two smoothed areas being spaced apart from each other by about 180°, each of said smoothed areas having a constant angular width of 10° to 90°, the remaining surface areas between said two smoothed surface areas being porous.

2. The sintered oil-impregnated bearing of claim 1, wherein the smoothed areas and porous areas are portions of a cylindrical inner surface.

3. The sintered oil-impregnated bearing of claim 2 wherein said polygonal surface areas are composed of three individual planar surfaces.

4. The sintered oil-impregnated bearing of claim 1 wherein said smoothed areas are made by a sizing process of polygonal surface areas.

5. The sintered oil-impregnated bearing of claim 1 wherein said two smoothed areas are produced by a sizing process of two projections having uniform thickness.

6. The sintered oil-impregnated bearing of claim 1 wherein said constant angular width is approximately 60°.

7. A sintered oil-impregnated bearing produced by a method having the steps of weighing the material for producing the bearing, mixing the material, molding the material, sintering the material, re-pressing the material and oil-impregnating the material, the method having the improved steps of producing a molded core having a curved internal surface and exactly two oppositely-oriented projection surfaces, the projection surfaces extending inwardly of an imaginary curved extension of the curved internal surface and having an angular width of 10° to 90°, and sizing the molded core during the re-press step to smooth the projection surfaces with a sizing rod to produce a continuous cylindrically shaped inner surface having two smoothed areas and two porous areas.

8. The sintered oil-impregnated bearing produced by the method of claim 7 wherein each projection surface is composed of a polygonal surface having three planar surfaces, each projection surface having a total angular width of about 60°.

9. The sintered oil-impregnated bearing produced by the method of claim 7 wherein each projection surface is of uniform thickness.

10. The sintered oil-impregnated bearing produced by the method of claim 7 wherein the smoothed areas of said inner surface are each about 60° and the porous areas are each about 120°, the smoothed areas being directly opposite to each other.

11. The sintered oil-impregnated bearing produced by the method of claim 7 wherein the planar surfaces are produced by a molding rod with corresponding surface areas.

12. The sintered oil-impregnated bearing produced by the method of claim 7 which includes the step of mounting the molded core in a housing prior to the re-press step and sizing the molded core while said core is mounted.

13. In a method of making a sintered oil-impregnated bearing wherein material for making the bearing is weighted, then mixed, then molded, then sintered, then re-pressed and then oil impregnated, the improvement comprising the steps of:
  producing a molded core having a curved internal surface and having exactly two oppositely-oriented projection surfaces, said surfaces extending inwardly of an imaginary curved extension of said curved internal surface, said projection surfaces having an angular width of 10° to 90°; and
  sizing said molded core during the re-press step to smooth said projection surfaces with a sizing rod to produce a continuous, cylindrically-shaped inner surface of said core having two smoothed areas and two porous areas.

14. The method of claim 8 wherein each projection surface is composed of a surface having three planar surfaces, each polygonal surface have a total angular width of about 60°.

15. The method of claim 8 wherein each projection has a uniform thickness and a total angular width of about 60°.

16. The method of claim 8 wherein the smoothed areas of said inner surface are each about 60° and the porous areas are each about 120°, the smoothed areas being directly opposed to each other.

17. The method of claim 14 or claim 15 wherein the projection surfaces are produced by a molding core rod with corresponding surface areas.

18. The method of claim 13 including the step of mounting said molded core in a housing prior to the re-press step, and sizing the molded core while said core is mounted.

* * * * *